3,511,699
Patented May 12, 1970

3,511,699
USE OF MODIFIED EPOXY SILICONES IN TREATMENT OF TEXTILE FABRICS
Gordon C. Johnson and Samuel Sterman, Williamsville, N.Y., assignors to Union Carbide Corporation, a corporation of New York
No Drawing. Filed Feb. 15, 1967, Ser. No. 616,206
Int. Cl. C08g 47/04; D06m 15/66
U.S. Cl. 117—135.5
3 Claims

ABSTRACT OF THE DISCLOSURE

Cellulosic and synthetic textile materials of improved softness, strength and water repellency are produced when coated or impregnated epoxy-modified silicons are cured. The epoxy silicons can be employed alone or in combination with conventional finishing resins such as urea-formaldehyde polymers.

---

The present invention relates in general to novel finished textile materials and to methods for preparing same, and more particularly to epoxy modified silicon treated textile materials and to methods for their preparation.

It is the general object of this invention to provide cellulosic and synthetic textile materials treated with epoxy modified silicons whereby these textiles possess improved and durable water-repellency and softness.

This and other and more particular objects which will be apparent from the specification appearing hereinafter are accomplished in accordance with the compositions of the present invention which comprise textiles of fibers having on at least their surfaces a finishing amount of a hydrophobic epoxy silicon having the general formula:

(I)  $MD_xU_yM'_q$ wherein D represents an $R_2SiO$ unit in which R is a monovalent hydrocarbon radical free of acetylenic unsaturation; U represents an

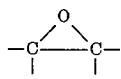 or $R'SiO_{3/2}$ unit in which R is a monovalent hydrocarbon radical free of acetylenic unsaturation and R' is a monovalent organic radical containing at least one vicinal epoxy

group; M and M' are in each occurrence the same or different end-blocking units having the formula:

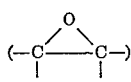

in which R is a monovalent hydrocarbon radical free of olefinic unsaturation, preferably an alkyl group containing from 1 to 6 carbon atoms or a hydrocarbyloxy radical in which the hydrocarbyl moiety is free of olefinic unsaturation and is preferably an alkoxy group containing from 1 to 10 carbon atoms or M and M' can be alkoxy radicals. R' is a monovalent organic radical containing a vicinal epoxy

group, $a$ has a value from 0 to 1 inclusive; $q$ has a value of 1 when $U=RR'SiO$ and $y+1$ when $U=R'SiO_{3/2}$, $x$ is an integer having a value of from 10 to about $10^5$, $y$ is an integer having a value of from 1 to about $10^2$; the sum of $x$, $y$, and $q$ being such that the silicon compound $MD_xU_yM'_q$ has a molecular weight of from about $10^3$ to about $10^6$ and the ratio of epoxy-containing units of units containing no epoxy groups is within the range of from about 0.001 to 0.5, preferably from about 0.01 to about 0.25. It is to be understood that the overall average molecular weight of the silicone is not narrowly critical. Whereas silicones have molecular weights of several thousand, viz. 1000 to 50,000 perform advantageously, the only significant limitation on the maximum molecular weight values is the high viscosity of very high molecular weight polymeric silicones. Although very viscous epoxy silicons are still suitably employed, they are inconvenient to utilize and thus are not preferred.

Illustrative of the monovalent hydrocarbon radicals represented by R in the $R_2SiO_{1/2}$ and

units defined above for U are alkyl groups containing from 1 to 10 carbon atoms, preferably 1 to 6 carbon atoms such as methyl, ethyl, propyl, butyl, isobutyl, amyl, hexyl, octyl, and decyl; alkenyl groups such as vinyl allyl, butadienyl, 1-pentenyl and the like; aryl radicals including fused ring structures such as phenyl, p-phenylphenyl, naphthyl, anthryl and the like; alkaryl radicals such as tolyl, xylyl, p-vinylphenyl, β-methylnaphthyl, and the like; aralkyl radicals such as stearyl, phenylmethyl and phenylcyclohexyl; and cycloalkyl radicals such as cyclopentyl, cyclohexyl and cyclobutyl. Preferred R radicals are alkyl with methyl being particularly preferred.

The monovalent organic radicals represented by R' which contain epoxy groups are, exclusive of the oxirane oxygen necessarily present, preferably hydrocarbon radicals free of acetylenic unsaturation or containing in addition to carbon and hydrogen only ether or carbonyl oxygen. Such R' radicals include 3,4-epoxycyclohexyl; 6-methyl - 3,4 - epoxycyclohexyl; 3-oxatricyclo[3.2.1.0$^{2,4}$] octane-6-propyl; 7 - butyl-3-oxatricycle[3.2.1.0$^{2,4}$]octane-6-methyl; 3,4-epoxycyclohexyl-1-ethyl; 9,10-epoxystearyl; γ-glycidoxypropyl; p(2,3-epoxybutyl) phenyl; and 3-(2,3-epoxybutyl)cyclohexyl. The vicinal epoxy group can be but need not be a terminal group of the R' radical. Moreover, the R' radical can be simply a

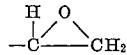

radical directly joined to silicon. A variety of epoxysilicones which are hereinbefore defined are illustrated structually and further characterized with respect to physical properties in J.A.C.S., vol. 81 at pages 2632–2635, E. P. Plueddemann et al.

Because of ready availability of precursors and the excellent results obtained using the final product the preferred M and D units of Formula I above are $(CH_3)_3SiO_{1/2}$ and $(CH_3)_2SiO$ respectively. More particularly preferred are the silicones containing these M and D units in combination with at least one U unit of the formula:

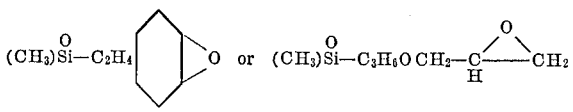

which polymers have the structure

wherein $y$ is an integer having a value of from about 8 to about 12 and $x$ is an integer having a value of from about 450 to about 550.

The aforesaid silicones are well known in the art and can conveniently be prepared, among other methods, by the platinum catalyzed addition of aliphatically unsaturated epoxy compounds to hydrosiloxanes, the ratio of reactants being such as to prevent the presence of unreacted, i.e., residual, hydrosiloxane moieties. It is to be understood however that trace hydrosiloxane contamination in the silicon can be tolerated without unduly affecting the compositions and processes of this invention, but preferably the silicon is hydrosiloxane-free. By trace amountes of hydrogen-siloxane is meant not more than that amount which will produce about 2 cc. hydrogen per gram of silicone by the NaOH gas evolution method.

The textile materials suitably employed as substrates for the application of the epoxy silicones of this invention include such diverse materials as cotton, wool, rayon, nylon and polyester fibers of the type well known in the art as Orlon and Dacron (both trade names of the Du Pont Company, U.S.A.).

The method of application of the epoxy silicone to the fabric is any of those conventional in the art for applying other finishing agents. A typical method of application is to pass the fabric through a treating bath containing silicone, squeezing out the excess liquid by means of rollers, and then heat the treated fabric to evaporate the water and cure the silicone. Sometimes the silicone is applied after all other finishing operations have been completed, and sometimes the silicone is applied along with other finishing agents. When substantive emulsifiers or emulsifier/catalyst systems are used with the silicone, the fabric can be treated batchwise.

Typical loadings range from approximately 0.2% to 3.0% silicone based on the dry weight of fabric. Higher loadings can be used, but economics and lack of improvement in performance make higher loadings impractical.

A catalyst is normally used with the epoxy silicones in order that the cure requirements correspond to the demands of the textile industry.

The types of catalysts normally used are (1) the metal salts of strong acids (i.e., aluminum sulfate, or zinc nitrate); (2) metal soaps (i.e., zinc-2-ethylhexoate or dibutyl tin diacetate or laurate); (3) non-polymeric anhydrides (i.e., tetrapropenylsuccinic anhydride).

The metal salts and soaps are generally used at a ratio of 0.1–10 parts metal/100 parts silicone with 2 parts metal/100 parts silicone being typical. The metal soaps are generally preferred because they result in the minimum loss of fabric strength. The anhydride catalysts are generally used at one mole anhydride to one mole epoxy.

Most materials applied to textiles are applied as a solution or dispersion in water. To make the epoxy modified dimethyl silicones water dispersible, it is necessary to emulsify them. The emulsifiers can be nonionic, cationic or anionic and the principal requirements are that stable emulsions are formed and the emulsifier does not interfere with the water repellent property of the silicone. Non-ionic emulsifiers include trimethylnonylpolyethylene glycol ether/nonylphenylpolyethylene glycol ether blends, poly(vinyl alcohol), and polyoxyethylene ester of mixed fatty and resin acids; cationic emulsifiers include N-cetylethyl morpholinium ethosulfate, and cationic starch, either alone or in combination with poly(vinyl alcohol) or sodium lignin sulfonate. A suitable anionic emulsifier has been found to be lauryl alcohol sulfate in combination with poly(vinyl alcohol). Typical emulsifier concentrations range from 1–15% by weight (3–8% preferred) based on the weight of epoxy silicone.

Although not normally employed, textile treatment can be from solvent. The epoxy modified silicones can be applied using aliphatic aromatic, chlorinated solvents, or hydroxylated solvents such as kerosene, benzene and perchloroethylene.

The epoxy modified silicone can be applied in conjunction with modifying resins and other textile finishing matetrials. These other finishing agents could include starch, other water repellents, either organic or silicone type, oil repellent, wash-wear resins, other organic softeners and lubricants, dyes and pigments, anti-slip agents, and the like, so long as they are compatible with the epoxysilicone. The epoxy modified silicones have been applied in conjunction with the wash-wear resin (dimethylolethylene urea or triazone), and excellent water repellency, softness and tear strength was obtained.

A cure at 110° C.–160° C. is recommended for maximum water repellency and durability and industry requirements for high speed processing. A typical laboratory cure is 5 minutes at 100° C. and 3 minutes at 160° C. However, the epoxy modified silicone of the preferred composition has developed water repellency and wash durability on cotton when only air dried for 8–10 days.

EXAMPLE

An epoxy modified dimethylsilicone finishing agent of this invention was prepared by first making a dimethyl-methylhydrogen copolymer. The procedure was to mix 80.3 grams trimethylsiloxane endblocked methylhydrogen polysiloxane (Union Carbide's L–31), 179 grams 2 cst. trimethylsiloxane endblocked dimethylpolysiloxane, 740 grams dimethylcyclicpolysiloxane and 20 grams sulfuric acid. The mixture was agitated for 2½ hours while being blanketed with nitrogen. The fluid was neutralized with 50 grams sodium bicarbonate and this mixture stirred for 1 hour. The fluid was then sparged with nitrogen at 170–175° C. for 1¼ hours and then cooled and filtered. The fluid has a viscosity of 20.5 cst. at 24° C., and a silanic hydrogen content of 29.6 cc. $H_2$/gram by the caustic gas evolution method.

To a flask equipped with a condenser and distillation head, was charged 400 grams of the above fluid and 150 cc. toluene. This was heated to 80° C. and 10 p.p.m. platinum was added based on the weight of reactants as chloroplatinic acid. The temperature was maintained at 90–100° C. and 90.6 grams of allylglycidyl ether was added over a ½ hour period. The fluid was then heated for 1 hour at 125° C. and then the toluene and excess allylglycidyl ether was stripped for 1 hour at 125° C. using 2 liters nitrogen sparge/minute. The fluid was cooled to below 50° C. under nitrogen and then vacuum desolvated for 1 hour at 125° C. and 40 mm. Hg pressure. The fluid was cooled and 5% of a filtering aid was added and then the fluid filtered. The fluid analyzed: viscosity— 48 centipoises at 25° C.; silanic hydrogen content—0.8 cc. $H_2$/g.; density—0.9662; epoxy—4.2% $C_2O$; and molecular weight—2180±218.

To emulsify this fluid, 14 grams polyoxyethylene sorbitan monooleate; 6 grams sorbitan monooleate and 200 grams of epoxy silicone fluid were mixed vigorously. While agitating, 447 grams of distilled water was added, and then this emulsion passed twice through a homogenizer at 7000 p.s.i. The resulting emulsion had a good appearance (bluish cast) and analyzed at 27.6% solid.

Other epoxy fluids were made by a similar procedure to give a series of epoxy silicones with the epoxy to dimethyl ratio of 19/2; 18/4 and 1/1, and emulsified in a similar manner.

Treating baths were prepared by mixing 10% by weight of a conventional urea-formaldehyde finishing resin, 1.5% by weight zinc-2-ethylhexoate catalyst, 2% silicone solids and the balance water. These baths were then used to treat 80 x 80 cotton cloth. The pressure on the pad rolls was set for 100% wet pickup of treating bath. The treated fabric was dried for 3 minutes at 240° F. and 4 minutes at 320–330° F. The samples were conditioned 1 hour at 50% relative humidity and 70° F. and then the coded samples evaluated for softness by a group of individuals. The samples were then washed at 150° F. for 14 minutes in a home washer to which had been added 11 gallons of water, 4 pounds clean rags and samples, 5 grams synthetic soil (carbon, paraffin oil, etc.) and 8 dry ounces of soap flakes. The samples were washed 10 times and evaluated again for softness. In each instance, the epoxy modified dimethylsilicones rendered the fabric soft and the softening was durable to laundering.

What is claimed is:

1. An article of manufacture, a textile having improved resistance to penetration by water, improved softness and strength, said textile having been treated with about 0.2 to about 3.0 weight percent, based on the dry weight of the textile, of a siloxane copolymer consisting essentially of trimethylsilyloxy end groups, dimethyl siloxane units and epoxy organic substituted siloxane units, which epoxy organic substituted siloxane units consist of methyl groups bonded to each Si thereof and an epoxy organic group bonded to each Si thereof, each epoxy organic group contains a vicinal epoxy group separated from the Si to which it is bonded by at least 2 sequential carbon atoms; said copolymer contains from 10 to about $10^5$ dimethylsiloxane units, from 1 to about $10^2$ epoxy organic substituted siloxane units, a molecular weight of from about $10^3$ to about $10^6$, and a ratio of epoxy organic substituted siloxane units to dimethylsiloxane units within the range of from 0.001 to 0.5.

2. The article of claim 1 wherein the epoxy organic substituted siloxane units have the formula:

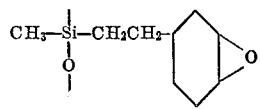

and the copolymer contains about 8 to about 12 of said epoxy organic substituted siloxane units and about 450 to about 550 dimethylsiloxane units.

3. The article of claim 1 wherein the epoxy organic substituted siloxane units have the formula:

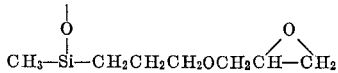

and the copolymer contains about 8 to about 12 of said epoxy organic substituted siloxane units and about 450 to about 550 dimethylsiloxane units.

References Cited

UNITED STATES PATENTS 3,055,774  9/1962  Gilkey et al. _____ 117—161 X

WILLIAM D. MARTIN, Primary Examiner

T. G. DAVIS, Assistant Examiner

U.S. Cl. X.R.

117—135.5, 138.8, 141, 143, 161